Figure 1:
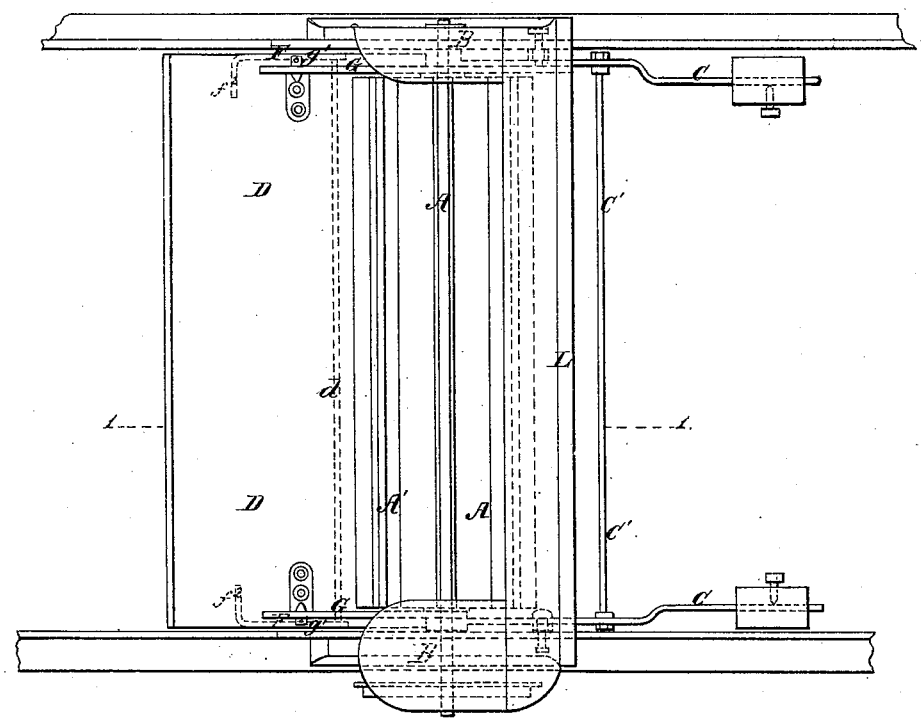

2 Sheets—Sheet I.

J. P. FISON.
FEEDERS FOR THRASHING-MACHINES.

No. 181,657. Patented Aug. 29, 1876.

Witnesses.

Inventor.
Jno. P. Fison
Per
Attorneys

N. PETERS, PHOTO-LITHOGRAPHER, WASHINGTON, D. C.

2 Sheets—Sheet 2.
J. P. FISON.
FEEDERS FOR THRASHING-MACHINES.
No. 181,657. Patented Aug. 29, 1876.
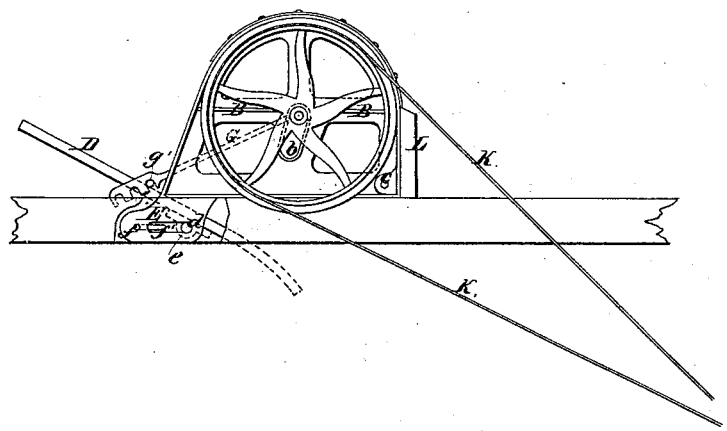
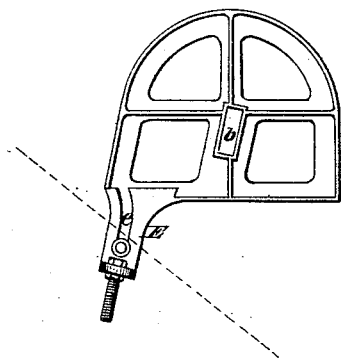 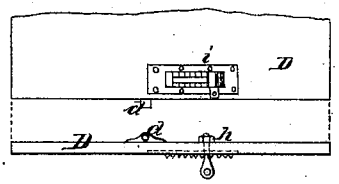
Witnesses.
Inventor.

UNITED STATES PATENT OFFICE.

JOHN POTTERTON FISON, OF TEVERSHAM, ENGLAND.

IMPROVEMENT IN FEEDERS FOR THRASHING-MACHINES.

Specification forming part of Letters Patent No. 181,657, dated August 29, 1876; application filed June 13, 1876.

*To all whom it may concern:*

Be it known that I, JOHN POTTERTON FISON, of Teversham, in the county of Cambridge, England, have invented a new and Improved Guard and Feeder for Thrashing-Machine Drums; and I do hereby declare that the following is a full, clear, and exact description of the same.

My invention relates to a combined drum-guard and feeder for thrashing-machines. It is designed to prevent accidents by making it impossible for any person to fall upon or be drawn into the drum, and to act, also, as a feeder or feed-regulator, whereby improper feeding, waste of corn, and the usual tendency to choke when fed by hand only, are completely obviated.

The invention consists in the employment of a balanced cylinder or reel and pivoted feed-board, arranged and operating in the following manner: The cylinder covers the full width and length of the mouth of the machine, and is supported by two counterweighted levers in such a way as to be capable of rising and falling, as hereinafter described.

The feed-board is mounted to swing on a horizontal axis, preferably at or about the middle of its height, and it is connected to the journals of the before-mentioned cylinder by links or connecting-rods. The cylinder is made to revolve by a belt, in order to assist and regulate the feed. Should, however, any unusual weight come upon either the cylinder or the upper part of the feed-board—as, for instance, a person falling on the same—the cylinder instantly descends or is brought down upon the feed-board, and the lower part of the feed-board at the same time rises to meet the cylinder. The cylinder and feed-board being thus brought together, the feed-opening of the thrashing-machine is entirely closed. When the cylinder falls, the belt which drives it becomes slackened, and the motion of the cylinder is consequently arrested. As soon as the weight is removed, the cylinder and feed-board return automatically to their working positions.

The connections between the cylinder and feed-board are adjustable to admit of the feed-board being set at different inclines, and the feed-board is so mounted as to be adjustable horizontally, or, by another arrangement, vertically. By this means the width of mouth or feed-opening is regulated as required.

In order that my invention may be more readily understood, I will proceed to more fully describe it in reference to the accompanying drawings, in which—

Figure 3:
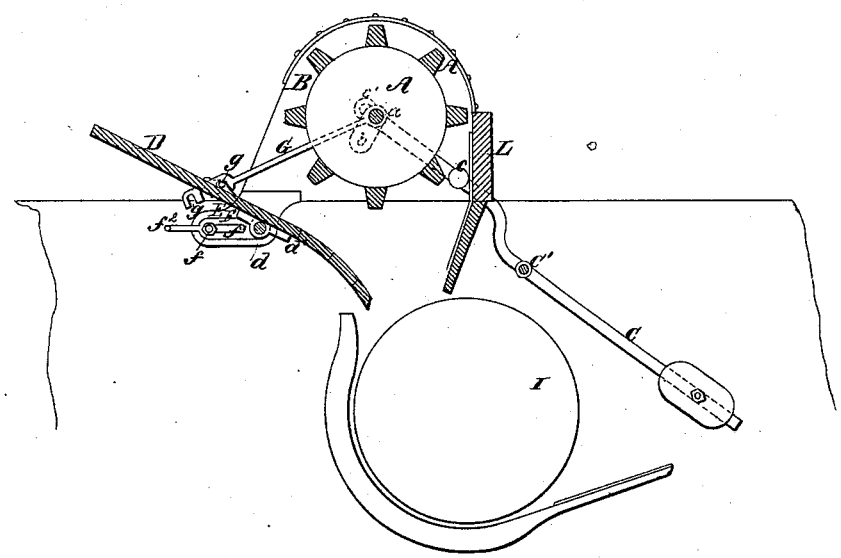

Figure 1 is a plan of the combined drum-guard and feeder. Fig. 2 is an end elevation. Fig. 3 is a sectional elevation of same on line 1 1, Fig. 1. Fig. 4 shows the arrangement for making the feed-board adjustable vertically. Fig. 5 shows face and edge views of one end of the feed-board, provided with adjustable connections for the coupling-rods.

A is the combined drum-guard and feed-regulating cylinder. Its journals revolve in movable bearings $a$, fitted in inclined slots $b$ in end frames or castings B, bolted to the main frame of the thrashing-machine. The length of slots $b$ is such as to allow the cylinder-bearing sufficient play up and down therein to bring the cylinder in contact with the feed-board. The cylinder A is supported in the highest or working position by two counterweighted levers, C, located within the body of the thrashing-machine, and each mounted on a fulcrum, stud, or bolt, $c$, fixed to end frames B. The journals of cylinder A are supported by the short arms of these levers, which have slots $c'$ for the journals to pass through, to allow of the cylinder rising and falling in its guides $b$. The counter-weights of levers C are movable thereon, in order to adjust the balance of the cylinder and feed-board accurately, and the two levers C are connected rigidly together by a cross-rod, $C'$. D is the inclined feed-board, pivoted on a horizontal cross-rod, $d$, passing through brackets $d'$, fixed at back of feed-board D, the ends of said rods $d$ being received in horizontal slots $e$ in an extension, E, of frame B.

The feed-board is made adjustable horizontally to enable the width of feed-opening to be regulated and adapted for all kinds of corn, and also readily removable to give access to the beaters. For this purpose a plate, F, is placed behind the extension E of the frame at either side of the machine. The plates F have a hole near one end, through which the ends of the rod $d$ pass before being received in slots $e$. Plates F are secured in the desired position by a screw-bolt, $f$, passing through a hole in E, and through a slot, $f'$, in F.

By means of plates F, which are provided with handles $f^2$, the feed-board may be moved backward or forward to increase or diminish the width of mouth as required. The feed-board may also be made to shift vertically for the same purpose, by mounting it as shown in Fig. 4. In this case the slots $e$ are vertical, and the feed-board supported and adjusted by set-screws, the plates F being dispensed with. The feed-board may, however, if desired, be otherwise mounted, so as to bring down the cylinder when any unusual weight comes on the feed-board.

Referring again to Figs. 1, 2, 3, G G are the connecting-rods, fitted at one end on the journals of cylinder A, and at the other end connected adjustably to the feed-board D. In this arrangement the connecting rods G have a number of gaps, $g$, by any one of which they may be attached to fixed studs $g'$ on the feed-board, whereby the length of connecting-rod may be altered as required. In Fig. 5 the connection is made by an eye on the connecting-rod G fitting on a stud on a screw-bolt, $h$, passing through a slotted plate, $i$, fixed on the feed-board D, said plate having a rack of teeth with which a V-tooth on the bolt $h$ engages, and in which it is secured by a nut on the bolt at back. By this means the connection can be readily shifted nearer to or farther from the axis of the feed-board, in order to set the latter at the required incline, or otherwise to adjust the connection to the height of the feed-board.

The cylinder A is, preferably, about fourteen inches in diameter, but may be more or less, if required; and its length is equal to that of the thrashing-drum I. The cylinder, which is of light construction, may have end and center frames of wood, and a covering of sheet-iron or zinc to resist pointed or heavy substances which may come in contact with it. A' are beveled wooden or metal bars or slats, fixed longitudinally on the cylinder at equal distances apart. They extend the whole length of the cylinder, and serve to divide and loosen the sheaves, bundles, or loose corn, when thrown on the feed-board or on the cylinder, and also to carry the corn uniformly and continuously to the mouth of the thrashing-drum. The cylinder A also serves to prevent stones or other heavy foreign substances, which may be fed in with the corn, being violently thrown out by the drum, to the danger of the attendants.

The cylinder A is driven by a belt, K, from the shaker-spindle. The ends of cylinder A are shielded, so as to prevent straw falling between the cylinder and end frames B onto the connecting rods or levers. A plank, L, passes across from one frame B to the other at back, and the cylinder A is partly covered to avoid back action when anything comes in contact with back of cylinder, and to prevent the corn falling anywhere but in its proper place. Instead of mounting the journals of cylinder A in movable bearings $a$ working in slots $b$ of the end frames, or castings B, as described, they may revolve in brass bushes fitted in bosses in the slots $c'$ at the ends of the counter-balance levers C.

The end castings B may each be made in two halves, so as to permit of the upper part, with the shield formed in one therewith, to be removed, to give access to the working parts.

Having described the nature of my invention and the manner of performing the same, I would observe that I do not confine myself to the precise arrangement and construction of the details of the apparatus herein shown and described; but

What I claim as new is—

In a thrashing-machine, a balanced guard-cylinder, connected to, and acting in combination with, a swinging feed-board, substantially as herein shown and described, for the purpose specified.

The above specification of my invention signed by me this 4th day of May, 1876.

JOHN POTTERTON FISON.

Witnesses:
WM. CLARK,
WM. S. L. SIMMOCH.